US005613260A

United States Patent [19]
Belanger et al.

[11] Patent Number: 5,613,260
[45] Date of Patent: Mar. 25, 1997

[54] SUSPENSION AND CONTROL SYSTEM FOR A VEHICLE SURFACE TREATING IMPLEMENT

[75] Inventors: Michael J. Belanger, Walled Lake; Robert J. Wentworth, Farmington Hills, both of Mich.

[73] Assignee: Belanger, Inc., Northville, Mich.

[21] Appl. No.: 508,979

[22] Filed: Jul. 28, 1995

[51] Int. Cl.⁶ .................................................. B60S 3/06
[52] U.S. Cl. .......................... 15/53.3; 15/DIG. 2; 15/53.2
[58] Field of Search .................................. 15/53.2, DIG. 2, 15/53.1, 53.3, 53.4, 97.3; 451/182, 236

[56] References Cited

U.S. PATENT DOCUMENTS

| | | | |
|---|---|---|---|
| 3,224,108 | 12/1965 | Flaming | 15/DIG. 2 |
| 3,292,192 | 12/1966 | Maxwell | 15/DIG. 2 |
| 3,510,899 | 5/1970 | Vollenweider et al. | 15/DIG. 2 |
| 3,593,358 | 7/1971 | Hofmann | 15/DIG. 2 |
| 3,688,329 | 9/1972 | Capra | 15/DIG. 2 |
| 3,793,663 | 2/1974 | Lieffring | 15/DIG. 2 |
| 3,798,696 | 3/1974 | Cirino | 15/53.2 |
| 3,822,429 | 7/1974 | Thompson | 15/53.2 |
| 4,338,698 | 7/1982 | Beer et al. | 15/DIG. 2 |

*Primary Examiner*—Gary K. Graham
*Attorney, Agent, or Firm*—Young & Basile, P.C.

[57] ABSTRACT

A vehicle surface treating implement, such as is used in a carwash, having an improved suspension and position control system. The surface treatment implement, such as a rotary brush, is carried at the free end of one or more secondary support arms which are in turn pivotally connected to one or more spaced apart primary support arms, said primary support arms being driven in rotation about an axis in accordance with signals as determined by the orientation of the secondary arms relative to a fixed reference which is in turn a function of the contact pressure between the brush and the vehicle surface being treated. Vehicles to be treated approach from the free ends of the primary arms, which rotate about the axis as necessary to maintain the brush in contact with the surface of the vehicle. In a preferred embodiment, the axis is horizontal and is well below the maximum height of vehicles to be treated.

9 Claims, 5 Drawing Sheets

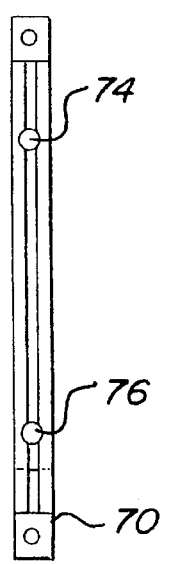
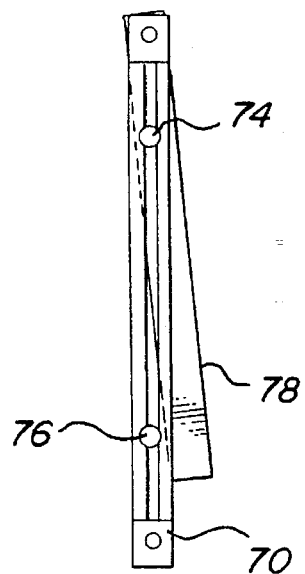
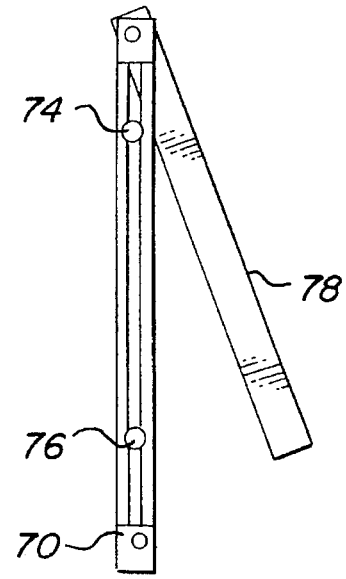
FIG-3A  FIG-3B  FIG-3C
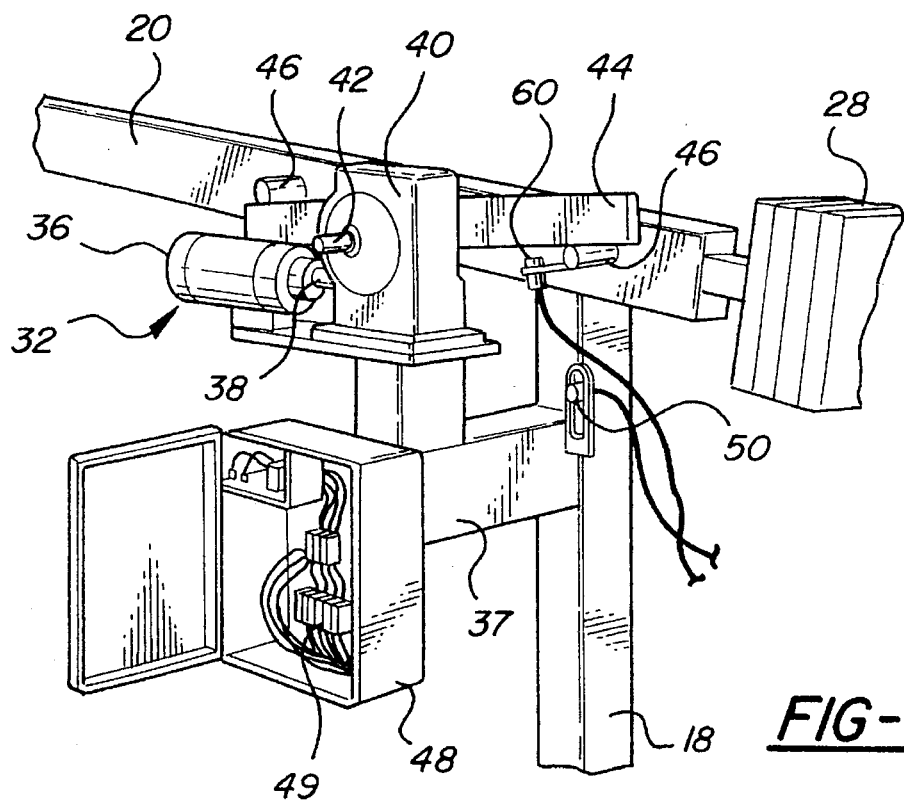
FIG-4

SUSPENSION AND CONTROL SYSTEM FOR A VEHICLE SURFACE TREATING IMPLEMENT

INTRODUCTION

This invention relates to vehicle surface treatment implements such as washing brushes, polishers and dryers and more particularly to an improved implement suspension and position control system which positions the implement relative to the surfaces of the vehicle.

BACKGROUND OF THE INVENTION

Vehicle treatment implements such as washing brushes, polishing brushes and dryer nozzles, for purposes of this disclosure, can be divided into two categories: those which are located adjacent the side or lateral surfaces of the vehicle and are generally called "vertical" implements, and those which are disposed overhead and are generally referred to as "horizontal" implements. In the case of a washing or polishing brush, the lateral or vertical brushes typically contact and wash the side surfaces of the vehicle whereas the horizontal brush typically contacts the hood, windshield, top, rear window and rear deck surfaces of the vehicle. Either or both of lateral and overhead brushes can be manipulated to contact the front and rear surfaces depending on the design of a particular system.

It is common for overhead or horizontal brushes to be disposed between the free ends of relatively long support arms which are in turn pivotally connected to vertical support structures located on opposite sides of vehicle treatment locations such as a conveyor lane. The conventional arrangement is to locate the pivot points of the support arms well above the maximum height of the vehicles to be treated, with the arms extending from the pivot points downward and in the same direction as relative vehicle travel. The implement support arms are typically counterweighted to control the pressure or weight which the implement exerts on the vehicle such that as the vehicle progresses through the wash lane the implement, e.g. the brush, is gradually forced upwardly as it engages the contours of the vehicle and is then permitted to descend, either in a free fall or controlled fall, down the rear surfaces as the vehicle passes under and beyond the brush.

There are a number of problems, deficiencies and disadvantages associated with a brush arrangement of this type including the fact that the brush may fall too rapidly against the rear deck surface or may tend to float relative to the vehicle unless a proximity detecting control system is used. In addition such an arrangement may rely on the rotation direction of the brush to maintain proper spacing and/or pressure between the brush and surfaces of the vehicle and this brush rotation direction may be such as to lift and/or damage windshield wipers and other vehicle appendages. Similar problems, deficiencies and disadvantages exist in vertical implements supported in a comparable manner but using Vertical implements may be supported in a comparable manner, but using some means other than gravity to bias the implement into contact with the vertical surface, and these arrangements may suffer from similar problems, deficiencies and disadvantages.

SUMMARY OF THE INVENTION

According to the present invention a suspension and control system is provided for vehicle treatment implements such as brushes, polishers, and dryer nozzles wherein the implement is mounted at the free end of at least one secondary support arm which is in turn pivotally connected to and carried by at least one primary support arm, said primary support arm being positively driven in rotation about a pivot axis in accordance with signals derived from the orientation of the secondary arm relative to a reference orientation which in turn is a function of the contact pressure or proximity between the implement and the vehicle surface being treated. By measuring and/or detecting the departure of the secondary arm orientation relative to the reference orientation, the motor activation state may be controlled, for example such that a first orientation is equated to minimum contact pressure and/or excessive spacing (in the case of a proximity switch) thereby to activate the motor to rotate the primary support arm so as to move the treatment implement closer to the vehicle surface. Similarly, a second orientation may be equated to heavy contact pressure and/or minimal spacing thereby to activate the motor to rotate the primary arm in the opposite direction and so move the treatment implement away from the vehicle surface. Finally, and by way of example, a third orientation intermediate the first and second orientations may be equated to optimum contact pressure or spacing in which case the motor drive is placed in a "hold" condition to maintain the treatment implement at its then-current position.

In accordance with a preferred embodiment of the invention, described herein with respect to a rotating surface washer brush of the cloth strip type, the invention comprises a pair of parallel primary support arms pivotally mounted at their first ends to pillars located on either side of the wash lane, with a pair of secondary support arms hanging downward from respective second ends of the primary arms and the wash brush mounted between the lower ends of the secondary arms. The brush fixture is thus configured to wash the upper surfaces of a vehicle, and deviation of the secondary arms from a reference position measured with respect to their free-hanging vertical position is used to control a motor which drives the primary arms about their pivot axis to raise and lower the wash brush.

In addition, a positional reference is conveniently created in the illustrative embodiment hereinafter described by means of a reference bar connected to a parallelogram linkage system which maintains the bar in a vertical orientation over a wide range of primary support arm angular travel. The reference bar carries thereon one or more position adjustable inductive sensors, albeit other types of sensors can be used, which are capable of determining the angular position or orientation of at least one of the secondary support arms with sufficient precision to provide the three stages of motor operation described above.

According to a further feature of the invention, a primary support arm suspension system of novel design is provided wherein the primary arm pivot axis is at a level below the maximum height of vehicles to be treated, and the primary arms extend upward and toward the vehicles approaching the implement rather than downward and away from approaching vehicles as is more customarily the case. This configuration wherein the primary arms extend opposite the direction of vehicle movement results in the floor-mounted support pillars being located at the forward end of vehicle movement through the wash station thereby allowing the pillars to be simultaneously utilized as mounting structures for implements performing other vehicle surface treatment functions executed after the top wash step is completed. The upward slope of the primary arms prevents the wash brush from being forced to move counter to the direction of vehicle movement as the primary arms lift away from the vehicle surface.

A further feature of the illustrative embodiment of the invention as hereinafter described lies in a safety drive and position switch system wherein the control arms are positively driven upwardly but can lift away from the drive means when being driven downwardly thereby to insure a damage free mode of operation under all foreseeable circumstances.

These and other features and advantages of the invention will become apparent from a reading of the following specification which describes an illustrative embodiment of the invention used in connection with a rotating vehicle washing brush of the cloth strip type.

BRIEF DESCRIPTION OF THE DRAWING

FIGS. 3A–3C is a series of views of a control assembly according to the present invention;

FIG. 4 is a perspective view of a portion of the present invention showing a drive assembly;

DETAILED DESCRIPTION OF THE PREFERRED EMBODIMENT

Figure 1:
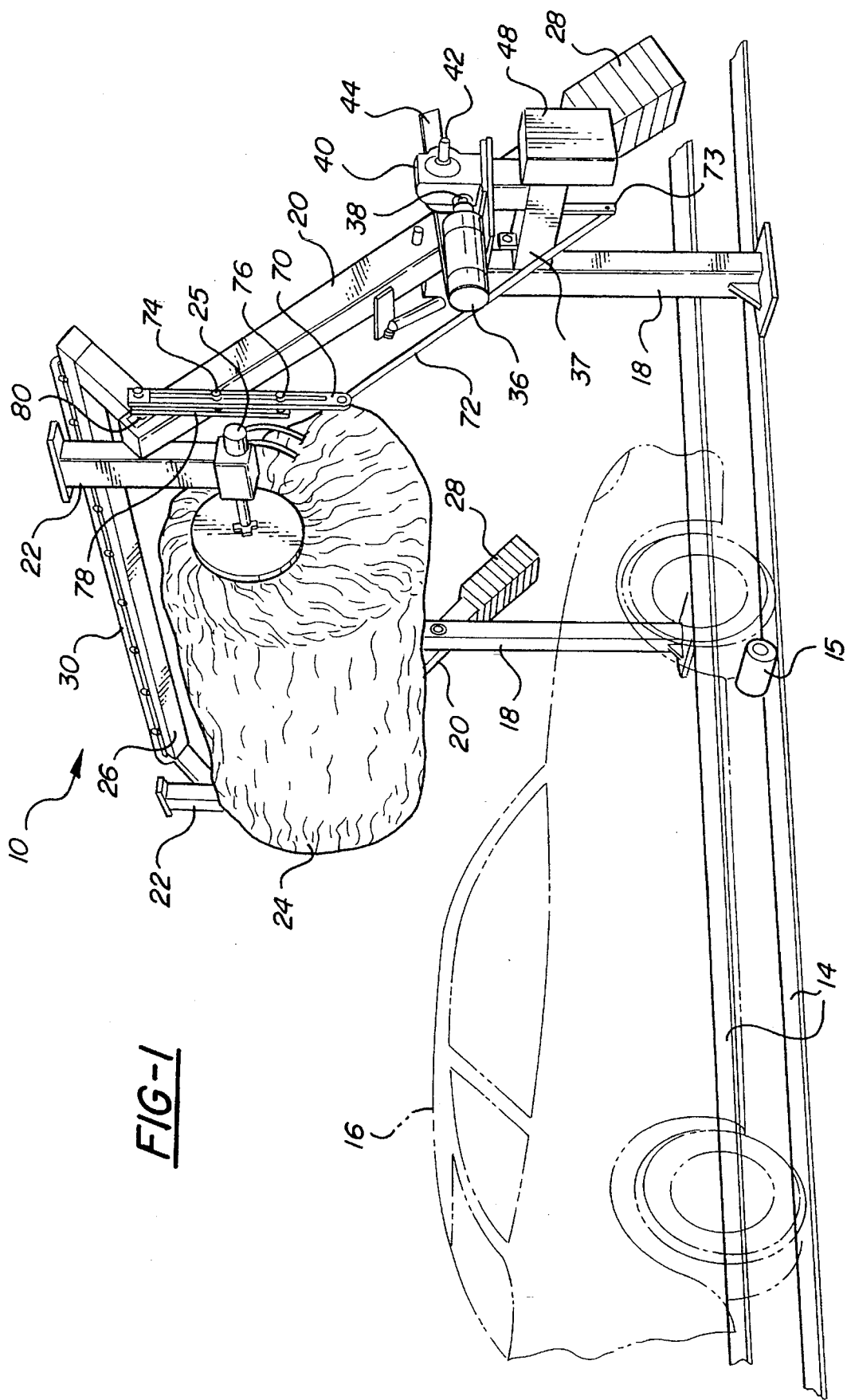
FIG. 1 is a overall perspective view of a top brush fixture in accordance with the present invention.

As depicted in FIG. 1, a vehicle surface treatment implement according to the present invention is embodied by a top brush fixture 10 positioned astride a pair of vehicle guide rails 14 which constitute a conveyor lane to guide an automobile 16 so as to pass through the top brush fixture 10. Automobile 16 is advanced at a controlled rate from an approach end of the lane to an exit end of the lane by a roller 15 which pushes against the rear of a wheel of the automobile and is moved along guide track 14 by an endless chain (not shown) located below the guide track. In a common full service car wash environment, additional surface treatment implements are disposed along the path of the conveyor lane in order to perform other steps of the car washing process, but these other implements are beyond the scope of the present invention and are not shown.

Top brush fixture 10 comprises a pair of support pillars 18 which are anchored to the floor at their lower ends, a pair of primary support arms 20 pivotally mounted to respective support pillars 18, a pair of secondary support arms pivotally suspended from the free ends of primary support arms 20, and a rotary washing brush 24 of the cloth strip type retained between the lower ends of secondary support arms 22. A brush motor 25 mounted on secondary support arm 20 drives washing brush 24 in rotation, and is preferably hydraulically powered. A connecting beam 26 spans and rigidly connects the free ends of primary support arms 20, serving to maintain primary support arms 20 substantially parallel with one another and to provide a mounting location for a spray bar 30 used to apply a water/soap mixture to brush 24 and/or directly to automobile 16. Support pillars 18, primary support arms 20, secondary support arms 22, and connecting beam 26 are all preferably fabricated from a high-strength, corrosion resistant aluminum alloy such as 2026. Counterweights 28 are attached to the ends of primary support arms 20 adjacent their points of attachment to support pillars 18.

A drive assembly 32 is mounted on a pedestal 37 extending from support pillar 18 and acts in conjunction with a control assembly 34 located at the free end of primary support arm 20 to rotate the primary support arms upward and downward in the manner hereinafter described.

As best seen in FIG. 4, drive assembly 32 includes a reversible electric motor 36 having an output shaft 38 which supplies power to a gear box 40. Gear box 40 serves to step down the rotational speed of motor 36 and is positioned so that gear box shaft 42 is aligned coaxially with the pivot axis of primary support arms 20. A lift bar 44 is rigidly fixed to the end of gear box shaft 42 and is substantially co-planar with the near face of primary support arm 20, and two lift posts 46 extend from the near face of the primary support arm in positions placing them in contact with the opposite ends of lift bar 44 when lift bar 44 is rotated clockwise with respect to primary support arm 20. A circuit box 48 is attached to pedestal 37 adjacent drive assembly 32 and houses electrical components constituting a motor control circuit 49. Circuit 49 may be microprocessor based, solid state, analog, or any type of machine control logic circuit known to those skilled in the art.

Figure 2:
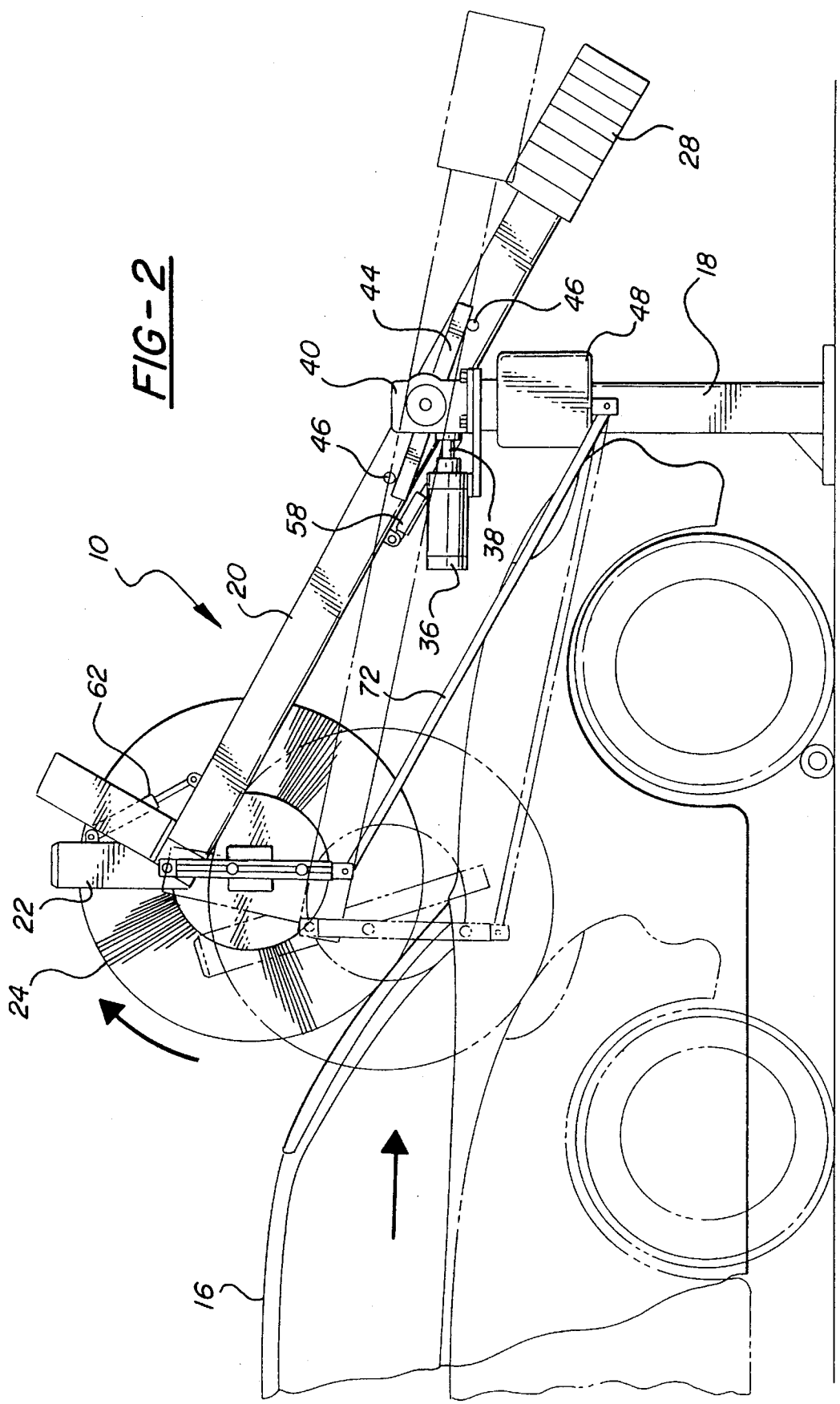
FIG. 2 is a side elevation view of an automobile advancing through the top brush fixture.
Figure 6:
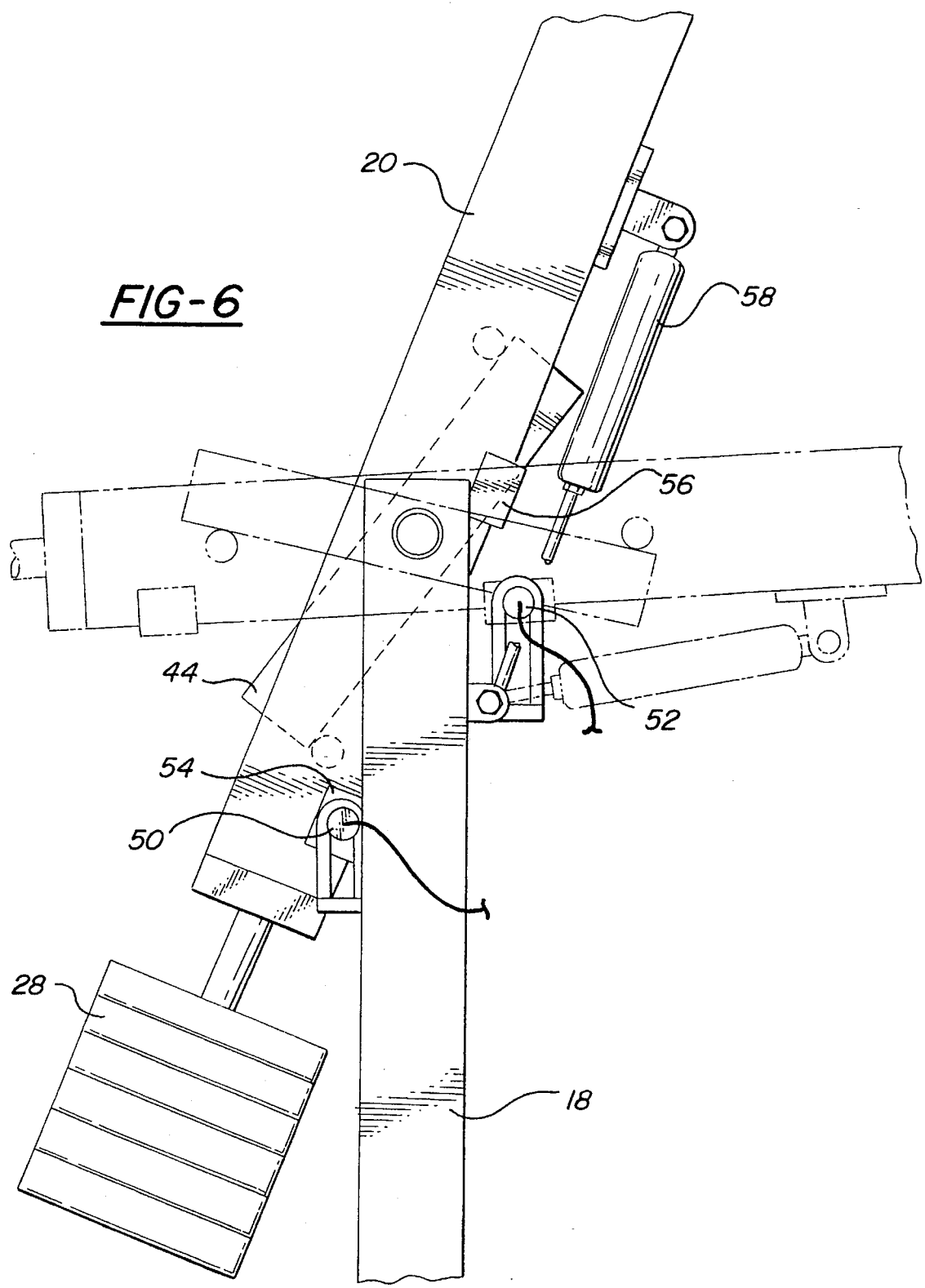
FIG. 6 is a partial perspective view of the top brush fixture of FIG. 1.

Referring now to FIG. 6, an up limit sensor 50 and a down limit sensor 52 are mounted on support pillar 18, preferably in a manner permitting some degree of adjustment to their vertical locations, such as by the slotted mounting shown. An up limit plate 54 is fixed to primary support arm 20 in a position such that when the support arms are rotated to a raised position, up limit plate 54 is placed in alignment with up limit sensor 50. Similarly, a down limit plate 56 is fixed to primary support arm 20 in a position to be aligned with down limit sensor 52 when support arms 20 are rotated downwardly. A runaway sensor 60 (see FIG. 4) is fixed to primary support arm 20 between lift posts 46 so that it is in close proximity with the undersurface of lift bar 44 only when the lift bar is in contact with lift posts 46. In the preferred embodiment of the invention, sensors 50, 52, and 60 are proximity sensors of the magnetic induction type well known in the art and when sufficiently close to a mass of ferrous metal such as limit plates 54, 46 or lift arm 44 respectively, generate electrical signals which are sent to control circuit 49. Any other type of conventionally know proximity or contact sensor may also be used, with corresponding changes made in the functioning of control circuit 49 hereinafter described. A hydraulic or pneumatic primary arm damper 58 is operatively connected between support pillar 18 and primary arm 20, serving to moderate the speed of rotation of primary support arms 20 about their pivot points. A secondary arm damper 62, visible in FIG. 2, is connected between primary arm 20 and secondary arm 22 and moderates the speed of secondary arm rotation.

Referring again to FIG. 1, control assembly 34 is shown to include angular reference bar 70 pivotally attached to the free end of primary support arm 20 and extending vertically downward therefrom. A link rod 72 is pivotally connected at a first end to the lower end of angular reference bar 70 and at a second end to a bar 73 depending from pedestal 37 at a point directly below the primary support arm pivot axis such that link rod, primary support arm, reference bar, and bar 37 form a parallelogram linkage. An upper sensor 74 and a lower sensor 76 are mounted to angular reference bar 70 in a manner to permit vertical adjustment of their positions, and are preferably of the magnetic induction type. A trigger bar 78 is formed of a ferrous metal and extends downwardly from the secondary support arm pivot axis. Trigger bar 78 is connected at its upper end to secondary support arm 22 by means of a shaft 80 passing through primary support arm 20.

Thusly, trigger bar 78 and secondary pivot arms 22 are connected to rotate in unison about the free end of primary support arms 20.

Operation

Primary support arms 22 are balanced by counterweights 28 such that the arms will at all times tend to rotate in a downward direction under the force of gravity, thus lowering washing brush 24 into proximity with automobile 16, with primary arm damper 58 causing this rotation to occur in a slow and controlled fashion. The downward movement of the arms continues until lift posts 46 come into contact with lift bar 44, which is held stationary unless motor 36 is energized. The angular position of lift bar 44 thus determines the position of primary support arms 20, with clockwise rotation of lift bar 44 (as see in FIGS. 1, 2, and 4) pushing against lift posts 46 to drive the arms in an upward direction, and counterclockwise rotation of the bar allowing the arms to rotate downward under the force of gravity. Lift bar 44 is driven in rotation by motor 36 via gear box 40, with the operation of the motor controlled by control circuit 49 which receives as inputs the electrical signals produced by up and down limit sensors 50, 52, runaway sensor 60, and upper and lower sensors 74, 76.

Figure 5A:
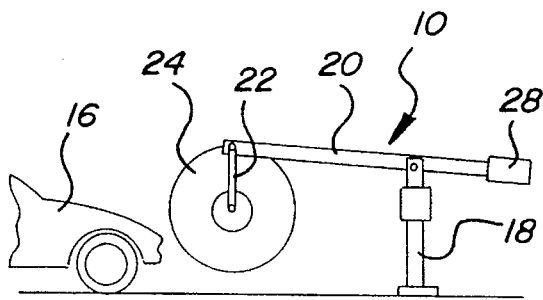
FIGS. 5A–5H is a series of views depicting the progression of an automobile through the complete wash cycle.
Figure 5B:
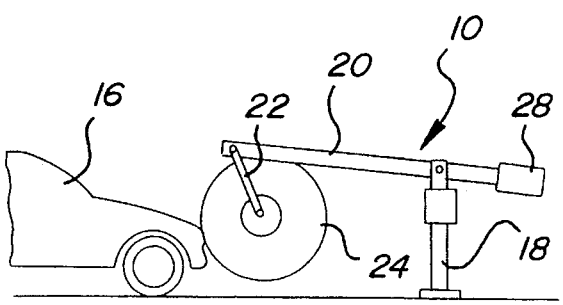

At the beginning of a top wash cycle as depicted in FIG. 5, top brush fixture 10 is in the condition shown in FIG. 5A and in phantom lines in FIG. 6, wherein primary support arms 20 are rotated to a "full down" position with their free ends slightly higher than their points of pivotal attachment to support pillars 18, and secondary support arms 22 along with washing brush 24 hang freely downward in a substantially vertical orientation. In the "full down" position shown, primary support arms 20 extend from their pivot points in a direction having a component opposite to the direction of movement of automobile 16 along the conveyor lane. The "full down" position is defined by that position of primary support arm 20 which places down limit plate 56 in front of down limit sensor 52 and so may be adjusted by changing the height of sensor 52. When down limit sensor 52 detects the presence of down limit plate 56, it generates a "full down" signal causing control circuit 49 to command motor 36 to stop rotation. As long as the "full down" signal is received by circuit 49, motor operation to rotate lift arm 44 any farther in the counterclockwise or downward direction is inhibited, but rotation in the upward direction may occur as hereinafter described.

The full down position is established so that brush 24, which during the wash cycle is driven in a clockwise direction by brush motor 25, hangs at a level where the grill or front end of automobile 16 contacts it as the automobile advances along guide rails 14. The pivot axis of primary support arms 20 is positioned below the maximum height of the vehicles to be treated, as best seen in FIG. 2, so that primary support arms 20 have a full down position wherein they maintain a slight upward incline while still positioning brush 24 low enough to wash a low-set automobile without secondary support arms 22 being cumbersomely long.

As automobile 16 advances into brush 24, the automobile pushes against the brush thereby causing secondary support arms to rotate about their points of attachment to primary support arms 20 (see FIG. 5B), with secondary arm damper 62 resisting and slowing such rotation. As secondary support arms 22 rotate away from the vertical, trigger bar 78 rotates with them while angular reference bar 70 maintains its vertical orientation due to link rod 72. Trigger bar 78 rotates to place control assembly 34 in the condition shown in FIG. 3C, in which the trigger bar is removed from proximity with both upper sensor 74 and lower sensor 76 so that neither sensor is sending an electrical signal to control circuit 49. The absence of signals from both sensors is interpreted by control circuit 49 as a "raise" command, and the circuit generates an output directing motor 36 to rotate lift arm 44 in a clockwise or upward direction. The rotating lift arm 44 bears against lift posts 46 to drive primary support arms 20 upward and thereby raise brush 24.

Figure 5C:
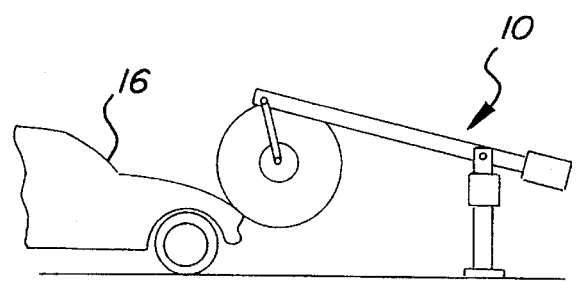
Figure 5D:
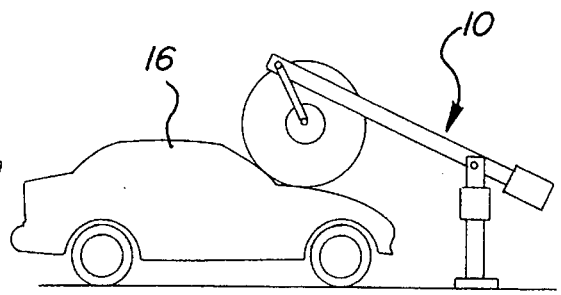

Motor 36 continues to rotate primary support arms 20 upwardly until secondary support arms 22 and trigger bar 78 rotate back toward the vertical by an amount to place control assembly 34 in the condition shown in FIG. 3B, wherein trigger bar 78 covers upper sensor 74 thereby causing it to resume generating an electrical signal. A signal from upper sensor 74 with no signal form lower sensor 76 is interpreted by control circuit 49 as a "hold" command, and the circuit directs motor 36 to stop rotation so that primary support arms 20 are held at their then-current positions. In a normal car wash sequence, this "hold" condition occurs when washing brush 24 is raised to a height sufficient for the hood portion of automobile 16 to begin to move underneath washing brush 24, as seen in FIG. 5C, thereby decreasing the amount of lateral pressure applied to brush 24 by automobile 16 so that the brush and secondary support arms 22 may swing back downward.

As long as control assembly 34 remains in the "hold" configuration, the angular position of primary support arms 20 is held constant. This condition, with secondary support arms 22 deviating a given amount from the vertical, constitutes a reference position and is selected to achieve an optimum washing position based on brush rotational speed, the amount of force which brush 24 applies to automobile 16, the forward speed of the automobile and other factors. For example, the greater the angle by which secondary support arms 22 deviate from the vertical, the greater the force applied to automobile 16 by washing brush 24. Note that the reference position as defined by the "hold" configuration of control assembly 34 may be adjusted as desired by changing the vertical positions of sensors 74,76 on reference bar 70.

If automobile 16 has a sloping hood, the advance of automobile 16 results in an increase in the height of the hood at the location of brush 24 so that the brush and secondary support arms 22 are pushed away from the "hold" position to the "raise" position and drive assembly 32 rotates primary support arms 20 incrementally until the optimum washing position is reacquired.

Figure 5E:
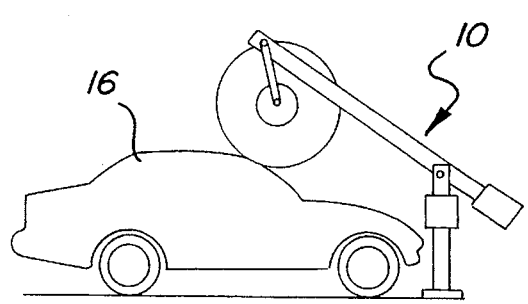

When automobile 16 advances to the point where brush 24 contacts the automobile windshield and is forced once more to the "raise" position, as seen in FIG. 5D, motor 36 again drives primary support arms 20 upward to lift brush 24 until it reaches the top of the windshield, at which point the secondary support arms swing back to the reference position, as seen in FIG. 5E, and control assembly 34 returns to the "hold" position.

Figure 5F:
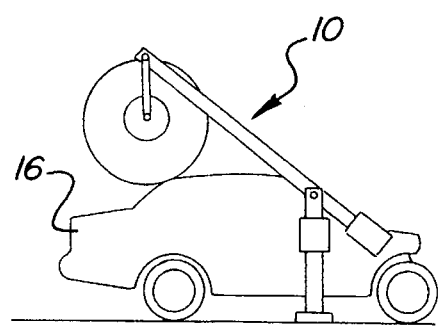

When automobile 16 advances to the point where brush 24 has reached the trailing edge of the automobile's roof as shown in FIG. 5F, secondary support arms 22 and brush 24 are no longer subjected to any lateral force and so swing back to a vertical orientation. In this condition, control assembly 34 is configured as shown in FIG. 3A with trigger bar 78 oriented vertically and so positioned directly in front of both upper sensor 74 and lower sensor 76 so that the sensors detect the proximity of the trigger bar and send electrical signals to control circuit 49. This combination of signals from both of sensors 74 and 76 is interpreted by control circuit 49 as a "lower" signal, and the circuit generates an output directing motor 36 to drive in the proper direction to rotate lift bar 44 in a counterclockwise direction so that primary support arms may rotate downward.

The "lower" command is inhibited and motor 36 is stopped if control circuit 49 receives either of two other sensor inputs. Firstly, when a "full down" signal is received from down limit sensor 52 as described above and, secondly, upon termination of a signal generated by runaway sensor 60. Runaway sensor 60 is positioned to detect the ferrous mass of lift arm 44, and so generate an electrical signal, as long as lift arm 44 is in contact with lift posts 46. The signal terminates only when lift bar 44 rotates out of contact with lift posts 46, which occurs only if the lift bar is rotated by motor 36 in a downward direction at a rate faster than primary support arms 20 can follow. Upon loss of the signal from runaway sensor 60, control circuit 49 causes drive motor 36 to stop in spite of the presence of a "lower" command from sensors 74 and 76.

Note that because of the interaction of lift bar 44, lift posts 46 and runaway sensor 60, primary support arms 20 are never driven downward under power by a "lower" command, but rather are merely allowed to descend under the force of gravity. The weight of brush 24 and the other components located at the free ends of primary support arms 20 is balanced by counterweights 28 to reduce the maximum downward force that brush 24 applies on automobile 16 to a level sufficiently small that damage to the automobile is extremely unlikely. Primary arm damper 58, by limiting the speed at which primary support arms 20 may rotate, also serve to substantially eliminate the possibility of damaging force being applied to the automobile.

A "full up" position of brush 24 is defined by that position of primary support arm 20, as shown in solid lines in FIG. 6, which places up limit plate 54 in front of up limit sensor 50. In a manner similar to that of down limit sensor 52, when up limit sensor 50 detects the presence of up limit plate 54 it generates a "full up" signal causing control circuit 49 to command motor 36 to stop rotation. As long as the "full up" signal is received by circuit 49, motor operation to rotate in the upward direction is inhibited. This "up limit" protection is necessary to prevent primary support arms 20 from rotating to a position sufficiently close to vertical that they may over-balance and continue to rotate downward in the wrong direction. Although not contemplated as a part of normal operation, the "full up" position may be reached if a vehicle exceeding the maximum recommended height for top brush fixture 10 is admitted to the carwash, or if a mechanical or electrical malfunction results in motor 36 driving lift bar 44 too far in the upward direction.

Figure 5G:
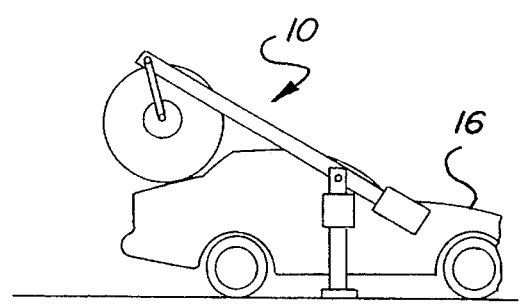
Figure 5H:
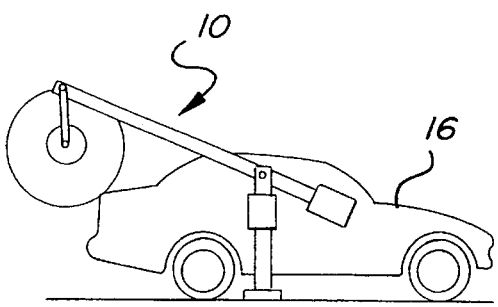

Resuming the top wash sequence again with FIG. 5G, primary support arms 20 rotate downward under the influence of the "lower" command until brush 24 contacts the top of the automobile rear deck and friction between the clockwise rotating brush and the automobile surface causes secondary support arms 22 to swing back to the optimum washing position as defined by the "hold" position. Automobile 16 continues to advance until the brush reaches the rearmost end of the rear deck, at which point secondary support arms 22 return to the vertical position, as shown in FIG. 5H, thereby causing control assembly 34 to generate a "lower" command and rotate primary support arms 20 downward until they reach the position at which down limit sensor 52 generates a "full down" signal to stop motor 36, thereby completing the top wash cycle.

For automobiles having very complicated or rounded contours, an actual washing sequence can result in the system cycling between the "raise," "hold," and "lower" conditions much more frequently than described above as the automobile passes through the wash station. The control and drive systems cooperate to incrementally and, if necessary, nearly continuously change the height of wash brush 24, always pursuing the reference optimum wash position which exists when the "hold" condition is attained.

As is apparent from the above description, the use of the angular position of secondary control arms 22 as an input controlling the vertical position of brush 24 provides a simple and effective method by which to optimally control brush pressure against the surface of an automobile regardless of its contours. Note that angular reference bar 70 need not be vertical, but need only be maintained in a constant orientation so as to constitute a fixed frame of reference from which the reference position of secondary support arms 22 may be measured.

It will be appreciated that the drawings and descriptions are merely meant to illustrate a particular embodiment of the present invention and are not meant to be limitations upon the practice thereof, as numerous variations will occur to persons of skill in the art. For example, the present invention may also be practised in a fixture having only one primary support arm and/or only one secondary support arm. As another example, the present invention is also applicable to a fixture in which primary arm rotation is about a vertical axis in order to treat the sides of an automobile. In such a fixture gravity will not bias the primary and secondary arms to place the treating implement in contact with the vehicle surface, so some other biasing means such as springs or the like must be provided.

It is also possible for the present invention to be practiced by a vehicle surface treatment fixture in which a suspension and control apparatus substantially as described above is mounted on a movable gantry which travels along the length of a stationary vehicle during the surface treatment sequence. Such gantries, commonly known as "roll-over" units, are well known in the vehicle surface treating field.

We claim:

1. Apparatus for treating the exterior surfaces of a vehicle comprising:

support means;

at least one primary support arm having a first end pivotally connected to the support means for rotation about a first axis and an opposite second end;

at least one secondary support arm pivotally connected to the primary arm adjacent the second end thereof, the secondary support arm having a reference position relative to a fixed frame of reference and being displaceable from the reference position;

a surface treating implement mounted on the secondary support arm;

a reference bar pivotally mounted to the primary support arm and maintaining a constant angular orientation with respect to the reference position regardless of the position of the primary support arm;

sensor means mounted to the reference bar to detect the position of the secondary support arm relative to the reference position and generate signals in response to said relative position of the secondary support arm; and means actuable by the sensor signals to rotate the primary support arm.

2. Apparatus as defined in claim 1 wherein the sensor means includes one or more magnetic induction sensors which generate electrical signals in response to the proximity of a trigger bar connected to one of the secondary support arms for pivotal movement therewith.

3. Apparatus for treating exterior surfaces of a vehicle comprising:

first and second spaced apart support pillars disposed adjacent to opposite sides of a vehicle treatment location;

first and second parallel primary support arms pivotally connected to respective support pillars for rotation about a substantially horizontal first axis, each primary support arm having a counterweighted end and a free end;

first and second parallel secondary support arms pivotally connected to respective primary support arms adjacent to the free ends thereof for rotation about a second axis parallel to the first axis;

a surface treating implement mounted between the secondary arms whereby the arms tend to depend essentially vertically from the free ends of the primary arms under the force of gravity to position the implement below the second axis;

means actuable to rotate the primary arms about the first axis in a first direction to raise the implement relative to a vehicle in the location and in a second direction to lower the implement relative to a vehicle in the location;

a reference bar pivotally connected to one of the primary support arms for rotation about the second axis;

a parallelogram linkage maintaining the reference bar in a substantially vertical orientation over a wide range of primary support arm rotation;

a trigger bar connected to one of the secondary support arms for pivotal movement therewith about the second axis;

sensor means mounted to the reference bar to detect the angular position of the trigger bar relative to a reference orientation and respond to deviation therefrom by producing signals which cause the actuator means to raise or lower the primary arms in accordance with a control logic.

4. Apparatus for treating exterior surfaces of a vehicle as the vehicle moves in a substantially linear direction relative to the apparatus, the apparatus comprising:

support means;

at least one primary support arm having a first end pivotally connected to the support means for rotation about a substantially horizontal axis and an opposite second end, the primary support arm having a full down position wherein the arm extends from the first axis towards the second end in a direction having a component opposite to the direction of movement of the vehicle relative to the apparatus and wherein the second end of the primary support arm is higher than the axis, and the primary support arm biased to rotate about the axis to lower the second end of the arm toward the full down position;

rotation limiting means mounted to the support means for preventing the primary arm from rotating beyond the full down position such that the second end of the arm is lower than the axis;

at least one secondary support arm pivotally attached to the primary support arm adjacent the second end thereof;

a surface treating implement mounted to the secondary support arm; and arm actuation means for rotating the primary support arm about the axis in response to pivoting movement of the secondary arm about the primary arm due to movement of the vehicle past the implement.

5. Apparatus as defined in claim 4 wherein the secondary support arm is biased to rotate toward a reference position relative to a fixed frame of reference and is displaceable from the reference position, and the arm actuation means comprises means for detecting displacement of the secondary arm from the reference position and responding to said displacement by rotating the primary arm toward a position allowing the secondary arm to assume the reference position.

6. Apparatus as defined in claim 4 further including a second primary support arm parallel to the one primary support arm.

7. Apparatus as defined in claim 4 further including a second secondary support arm parallel to the one secondary support arm.

8. Apparatus as defined in claim 4 wherein the surface treating implement is a cloth brush.

9. Apparatus for treating exterior surfaces of a vehicle moving along a conveyor lane from an approach end of the lane to an exit end of the lane, the apparatus comprising:

first and second support pillars disposed adjacent the exit end of the conveyor lane and on first and second sides of the conveyor lane respectively;

first and second substantially parallel primary support arms having first ends pivotally connected to the first and second support pillars respectively for rotation in unison about a substantially horizontal axis and opposite second ends, the primary support arms biased to rotate toward a full down position wherein the second ends of the arms extend from the axis toward the approach end of the conveyor lane and wherein the second ends are higher than the axis;

rotation limiting means mounted to the support pillars for preventing the primary arms from rotating beyond the full down position such that the second ends of the primary arms are lower than the axis;

first and second secondary support arm pivotally connected to the first and second primary support arms respectively adjacent the second ends thereof, the secondary support arms biased to rotate toward a reference position relative to a fixed frame of reference and being displaceable from the reference position;

a surface treating implement mounted between the secondary support arms; and arm actuation means for detecting displacement of the secondary support arms front the reference position and responding to said displacement by rotating the primary support arms toward a position allowing the secondary arm to assume the reference position.

* * * * *